(12) United States Patent
Sato

(10) Patent No.: US 7,240,122 B2
(45) Date of Patent: Jul. 3, 2007

(54) FILE SHARING DEVICE AND INTER-FILE SHARING DEVICE DATA MIGRATION METHOD

(75) Inventor: Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 10/767,442

(22) Filed: Jan. 30, 2004

(65) Prior Publication Data

US 2005/0055402 A1     Mar. 10, 2005

(30) Foreign Application Priority Data

Sep. 9, 2003     (JP)     ............... 2003-316291

(51) Int. Cl.
*G06F 15/16* (2006.01)
(52) U.S. Cl. ...................... 709/232; 709/214
(58) Field of Classification Search .............. 709/213, 709/214–216
See application file for complete search history.

(56) References Cited

U.S. PATENT DOCUMENTS

| | | | | |
|---|---|---|---|---|
| 5,276,867 A | * | 1/1994 | Kenley et al. | 707/204 |
| 5,367,698 A | * | 11/1994 | Webber et al. | 709/203 |
| 5,680,640 A | * | 10/1997 | Ofek et al. | 710/19 |
| 5,715,452 A | * | 2/1998 | Mori et al. | 707/201 |
| 5,832,522 A | * | 11/1998 | Blickenstaff et al. | 707/204 |
| 5,835,954 A | * | 11/1998 | Duyanovich et al. | 711/162 |
| 5,896,548 A | * | 4/1999 | Ofek | 710/20 |
| 6,108,748 A | * | 8/2000 | Ofek et al. | 711/112 |
| 6,230,239 B1 | * | 5/2001 | Sakaki et al. | 711/112 |
| 6,240,486 B1 | | 5/2001 | Ofek et al. | |
| 6,374,327 B2 | * | 4/2002 | Sakaki et al. | 711/112 |
| 6,546,404 B1 | * | 4/2003 | Davis et al. | 707/204 |
| 6,567,823 B1 | * | 5/2003 | Rothschild | 707/104.1 |
| 6,981,005 B1 | * | 12/2005 | Cabrera et al. | 707/203 |
| 7,013,373 B2 | * | 3/2006 | Mimatsu et al. | 711/162 |
| 2002/0004890 A1 | | 1/2002 | Ofek et al. | |
| 2002/0144047 A1 | | 10/2002 | Loy et al. | |
| 2003/0093439 A1 | * | 5/2003 | Mogi et al. | 707/200 |
| 2003/0182257 A1 | * | 9/2003 | O'Connell et al. | 707/1 |
| 2004/0049553 A1 | * | 3/2004 | Iwamura et al. | 709/213 |

(Continued)

FOREIGN PATENT DOCUMENTS

JP     2000-173279     12/1998

*Primary Examiner*—Patrice Winder
*Assistant Examiner*—Thomas Duong
(74) *Attorney, Agent, or Firm*—Reed Smith LLP; Stanley P. Fisher, Esq.; Juan Carlos A. Marquez, Esq.

(57) ABSTRACT

Data migration from an existing NAS to a new NAS and processing of access from a client are executed in parallel. A migration destination NAS inherits the host name and IP address of a migration source NAS. The network environment parameters of the migration source NAS are changed to different values. The migration destination NAS causes data to migrate from a migration source storage region, in which a shared file system of the migration source NAS is mounted, to a migration destination storage region. In a case where there is an access request from the client during data migration, the migration destination NAS selects one of the storage region in correspondence to the migration status of the requested data and provides that data. Data of a "not copied" status is provided from the migration source storage region. Data of a "copied" status is provided from the migration destination storage region.

33 Claims, 12 Drawing Sheets

U.S. PATENT DOCUMENTS

2004/0080558 A1* 4/2004 Blumenau et al. ............ 347/19
2004/0143799 A1* 7/2004 Hegde et al. .................. 716/3
2005/0010733 A1* 1/2005 Mimatsu et al. ............ 711/162

* cited by examiner

FIG. 3

| MIGRATION SOURCE HOST NAME | MIGRATION SOURCE SHARED FILE SYSTEM | MIGRATION DESTINATION MOUNT POINT OF MIGRATION SOURCE | FILE NAME | STATUS | NOT COPIED USE FREQUENCY | MIGRATION DESTINATION SHARED FILE SYSTEM |
|---|---|---|---|---|---|---|
| FS1SRC | /mnt1 | /mnt1src | FILE 11 | COPIED | — | /mnt1 |
| | | | FILE 12 | BEING COPIED | — | |
| | | | ... | ... | ... | |
| | /mnt 2 | /mnt2src | FILE 121 | NOT COPIES | 10: LOW | /mnt2 |
| | | | FILE 122 | ACCESSING MIGRATION SOURCE | 250: HIGH | |
| | | | ... | ... | ... | |

FIG. 4A

| HOST NAME | SETTING INFORMATION OF MIGRATION SOURCE PRIOR TO MIGRATION | | | CHANGED INFORMATION ACCOMPANYING DATA MIGRATION OF MIGRATION SOURCE | | |
|---|---|---|---|---|---|---|
| | IP ADDRESS, SUBNET MASK | ADMINISTRATOR USER ACCOUNT | MIGRATION SOURCE SHARED FILE SYSTEM | CHANGED HOST NAME | CHANGED IP ADDRESS, CHANGED SUBNET MASK | DATA MIGRATION USER ACCOUNT |
| FS1 | 192.168.100.100 255.255.255.0 | admin | /mnt1 | FS1SRC | 192.168.100.200 255.255.255.0 | admin |
| | | | /mnt2 | | | |

FIG. 4B

| TEMPORARY HOST NAME | TEMPORARY IP ADDRESS | TEMPORARY SUBNET MASK |
|---|---|---|
| FS1target | 192.168.100.10 | 255.255.255.0 |

FILE SHARING DEVICE AND INTER-FILE SHARING DEVICE DATA MIGRATION METHOD

CROSS-REFERENCES TO RELATED APPLICATIONS

This application relates to and claims priority from Japanese Patent Application No. 2003-316291, filed on Sep. 9, 2003, the entire disclosure of which is incorporated herein by reference.

BACKGROUND OF THE INVENTION

1. Field of the Invention

The present invention relates to a file sharing device known as a file server or NAS (Network Attached Storage) and an inter-file sharing device data migration method.

2. Description of the Related Art

File servers are used in order for data to be shared between plural computer terminals dispersed on a network. As an early file server, a server where a file sharing protocol such as CIFS (Common Internet File System) or NFS (Network File System) is disposed in a versatile OS (Operating System) is known. As an improved file server, an NAS where a dedicated OS specializing in file sharing services is used to support plural file sharing protocols (CIFS, NFS, DAFS (Direct Access File System), etc.) is known.

The number of files to be shared and the number of clients using shared files have been increasing each year, and individual file sizes also continue to increase. In order to accommodate the increased demand for file sharing services, storage devices and communication lines are being strengthened and technology is switching over to high-performance file servers.

Several methods of causing data to migrate from old file servers to new file servers are known. A first method is a method that temporarily suspends file access from a client and occupies the migration source file server (old file server) and the migration destination file server (new file server) to carry out data copying between both file servers. A second method is a method that backs up data retained in the migration source file server and causes the migration destination file server to restore the backup data.

A third method that causes data to migrate without stopping the file sharing service is also known (JP-A-2000-173279). In this third method, when access is made by a client during data migration and data to which access has been requested is data that has already been copied to the migration destination file server, the data is provided from the migration destination file server to the client. Alternatively, when the data to which access has been requested is data that has not yet been copied to the migration destination file server, the data is provided from the migration destination file server to the client once the data has been copied from the migration source file server to the migration destination file server.

In the first method, the client cannot use the file sharing service until data migration is completed, because the migration source file server and the migration destination file server are occupied during the data migration. In a case where the amount of migration target data is relatively small, it is possible to resume the file sharing service for a short period. However, as the amount of data increases, the stopped time of the file sharing service increases.

In the second method, the file sharing service can be continued using the migration source file server while the backup data is being restored in the migration destination file server. However, when the client updates the data during restoration, a difference arises between the latest data of the migration source file server and the backup data. Thus, for example, an access log during restoration is kept and, after restoration is completed, the storage content of the migration destination file server is updated to the latest state on the basis of the access log. In this case, after restoration is completed, labor for synchronizing the storage contents between the migration destination file server and the migration source file server becomes necessary, and this takes time. As another method, providing a file sharing service in a read-only mode during restoration is also conceivable. However, this is not very convenient because the client can only read the data.

In the third method, the file sharing service can be provided to the client even during data migration. However, in the third method, in a case where the client requests access to data that has not yet been copied to the migration destination file server, the data is copied from the migration source file server to the migration destination file server and provided from the migration destination file server to the client. In other words, in the third method, the responsiveness of the service drops because the data to which access has been requested by the client is provided to the client after it is first copied to the migration destination file server. Also, in the third method, the configuration becomes complicated and costs also rise because it is necessary to dispose a data migration-dedicated interface in both of the migration source file server and the migration destination file server.

SUMMARY OF THE INVENTION

The present invention was made in light of the above-described problems, and it is an object thereof to provide a file sharing device and an inter-file sharing device data migration method that can conduct data migration without stopping a file sharing service.

It is another object of the invention to provide a file sharing device and an inter-file sharing device data migration method that can provide a file sharing service with high responsiveness during data migration.

It is yet another object of the invention to provide a file sharing device and an inter-file sharing device data migration method that can independently execute, in parallel, data migration processing and processing of an access request from a host computer.

It is still another object of the invention to provide a file sharing device and an inter-file sharing device data migration method configured to control the priority of data to be migrated in accordance with the use frequency of the data.

Further objects of the invention will become apparent from the description of the embodiment discussed later.

In order to achieve these objects, a file sharing device according to the invention is communicably connected to a migration source file sharing device and a host computer via a communications network, and includes data migrating means and access processing means. The data migrating means causes data retained in a file system of the migration source file sharing device to migrate to a file system of the file sharing device. The access processing means processes access from the host computer in correspondence to data migration statuses during the data migration processing by the data migrating means. Additionally, the access processing means causes data to be provided from the file sharing system of the file sharing device in the case of access to data that can be used from the file system of the file sharing device and provides data from the file system of the migration source file sharing device in the case of access to data that cannot be used from the file system of the file sharing device.

Here, examples of the file sharing device include an NAS or a file server where a file sharing protocol is disposed in a versatile OS. The file sharing device of the migration source and the file sharing device (referred to be low as "the migration destination file sharing device") are connected via a communications network such as a LAN (Local Area Network). Also, the file sharing devices and the host computer are connected via the communications network. It should be noted that the invention is not limited to a case where all of the file system that the migration source file sharing device has is caused to migrate to the migration destination file sharing device, and also includes a case where part of the file system is caused to migrate.

The data migrating means causes data stored in the file system of the migration source file sharing device (referred to below as "the migration source file system") to migrate to the file system of the migration destination file sharing device (referred to below as "the migration destination file system"). In a case where there is a request for access to data by the host computer during data migration, the access processing means selects the provider of that data in correspondence to data migration statuses. That is, the access processing means causes data to be provided from the migration destination file system in a case where the request is a request for access to data that can be provided from the migration destination file system. The access processing means causes data to be provided from the migration source file system in a case where the request is a request for access to data that cannot be provided from the migration destination file system. Thus, access requests from the host computer can be received and processed while conducting data migration from the migration source file system to the migration destination file system, and data migration processing and access request processing can be executed in parallel.

In an aspect of the invention, the invention further includes connection switching means that switches access by the host computer from the migration source file sharing device to the migration destination file sharing device, wherein the connection switching means inherits network environment information for identifying the migration source file sharing device on the communications network and updates, to other values, the network environment information that had been set in the migration source file sharing device.

The migration source file sharing device and the migration destination file sharing device are identified on the communications network by network environment information. Examples of the network environment information include computer names and identification information (IP addresses, etc.). Depending on the specification of the communications network, the information necessary for distinguishing the computer resources on the network will differ. In a protocol such as TCP/IP, unique identification information such as an IP address is required in addition to a computer name. In other protocols, the computer resources on the network are identified by the computer name only.

The connection switching means causes the migration destination file sharing device to inherit the network environment information that had been set in the migration source file sharing device. The connection switching means also sets, to other values, the network environment information that had been set in the migration source file sharing device. Only the migration destination file sharing device grasps the new network environment information set in the migration source file sharing device. Thus, after the network environment information of the migration source file sharing device has been reset, only the migration destination file sharing device can access the migration source file sharing device.

More specifically, the connection switching means first sets the network environment in formation of the migration source file sharing device to other values. Next, the connection switching means sets the network environment information of the migration destination file sharing device to values that are the same as those of the original network environment information of the migration destination file sharing device. Thus, the migration source file sharing device and the migration destination file sharing device are switched on the communications network. Therefore, access can be switched from the migration source file sharing device to the migration destination file sharing device without the host computer perceiving this.

In an aspect of the invention, the invention further includes attribute information inheriting means that inherits attribute information retained in the migration source file sharing device, wherein the data migration processing by the data migrating means is initiated after inheritance of the attribute information by the attribute information inheriting means has been completed.

Examples of the attribute information include directory information and access management information. Because data migration processing is conducted after the migration destination file sharing device has been made to inherit the attribute information that the migration source file sharing device has, access processing corresponding to the attributes of the data can be conducted even if there is an access request from the host computer during data migration processing.

In an aspect of the invention, the invention further includes use frequency detecting means that detects the use frequency of data that cannot be used from the migration destination file system, wherein the data migrating means gives priority to and causes data to migrate beginning with data whose use frequency detected by the use frequency detecting means is equal to or greater than a predetermined value.

That is, in a case where access to data whose migration from the migration source file system to the migration destination file system has not been concluded is requested by the host computer, the use frequency detecting means measures the number of occurrences of access requests. Data whose use frequency is equal to or greater than the predetermined value is data whose request for access from the host computer is strong. The data migrating means gives priority to and causes data to migrate beginning with data having a high use frequency. Thus, data is given priority and causes to migrate to the migration destination file system beginning with data having a high use frequency, and data can be provided from the migration destination file system in a case where there is new access from the host computer.

In an aspect of the invention, the data migration statuses include (A) a first migration status representing a status where migration of data from the migration source file system to the migration destination file system has not been conducted, (B) a second migration status representing a status where data is migrating from the migration source file system to the migration destination file system, (C) a third migration status representing a status where migration of data from the migration source file system to the migration destination file system, and (D) a fourth migration status representing a status where data is being provided from the migration source file system; and, (a) in the case of the first migration status, the access processing means changes the migration status of data to which access has been requested to the fourth migration status, provides the data from the file system of the migration source file sharing device, and thereafter returns the migration status of the data to the first migration status, and (b) in the case of the second migration status, the access processing means provides the data from the file system of the migration source file sharing device in a read-only mode, and (c) in the case of the third migration status, the access processing means provides the data from the file system of the migration destination file system, and (d) in the case of the fourth migration status, the access processing means provides the data from the migration source file system in the read-only mode and thereafter changes the migration status of the data to the first migration status.

That is, the method of providing data is switched in correspondence to the four types of data migration statuses.

A method of data migration between file sharing devices according to another perspective of the invention is a method of causing data to migrate from a file system of a migration source file sharing device to a file system of a migration destination file sharing device, the method including the steps of: causing the migration destination file sharing device to inherit, prior to data migration, attribute information that the migration source file sharing device has; causing access from a host computer to be switched from the migration source file sharing device to the migration destination file sharing device; detecting the migration status of data to which access has been requested by the host computer; providing the data from the file system of the migration destination file sharing device in a case where the detected migration status of the data is a status where the data can be used from the file system of the migration destination file sharing device; and providing the data from the file system of the migration source file sharing device in a case where the detected migration status of the data is a status where the data cannot be used from the file system of the migration destination file sharing device.

A computer program according to another aspect of the invention is a computer program that allows a computer to execute a method of causing data to migrate from a migration source file sharing device, the method including the steps of: causing the computer to inherit, prior to data migration, attribute information that the migration source file sharing device has; causing access from a host computer to be switched from the migration source file sharing device to the computer; detecting the migration status of data to which access has been requested by the host computer; providing the data from the file system of the computer in a case where the detected migration status of the data is a status where the data can be used from a file system of the computer; and providing the data from a file system of the migration source file sharing device in a case where the detected migration status of the data is a status where the data cannot be used from the file system of the computer.

BRIEF DESCRIPTION OF THE DRAWINGS

FIG. 3 is an explanatory diagram showing an example of migration source/migration destination file system configuration information;

FIG. 4A is an explanatory diagram showing an example of migration source setting change information, and FIG. 4B is an explanatory diagram showing an example of temporary setting information used in the temporary launching of the migration destination NAS;

DESCRIPTION OF THE PREFERRED EMBODIMENT

An embodiment of the invention will be described below on the basis of FIGS. 1 through 13.

In the present invention, as will be described below, a storage region (file system) of a migration source file server serving as a migration target is occupied by a migration destination file server when data migration is carried out between the migration source file server and the migration destination file server. At this time, the migration destination file server inherits network environment information (e.g., computer name and IP address) of the migration source file server. Also, the network environment information of the migration source file server is updated to new values that only a migration destination file sharing device recognizes. The inheriting of the network environment information and the setting of the new network environment information are carried out by remote control from the migration destination file server. Thus, in a case where the client of a file sharing service conducts conventional access, the client is connected to the migration source file server without being cognizant of this.

In this state, the migration destination file server copies, to its own file system, data stored in the file system of the migration source file system. At the time of data migration, the migration destination file server manages the status of data copying with four types of statuses: "not copied", "being copied", "copied", and "accessing migration source". In a case where an access request from a client arises during data migration, the migration destination file server checks the status of the data to which access has been requested. The migration destination file server determines the provider of the data and provides the data to the client in correspondence to the migration status of the data. That is, the migration destination file server provides the client with the data copied to its own file system, or provides the client with data from the file system of the migration source file server that the migration destination file server is occupying.

Thus, in the present embodiment, data migration between file servers and an access request from the client can be independently processed in parallel, and a file sharing service with good responsiveness can be provided even during data migration processing.

Figure 1:
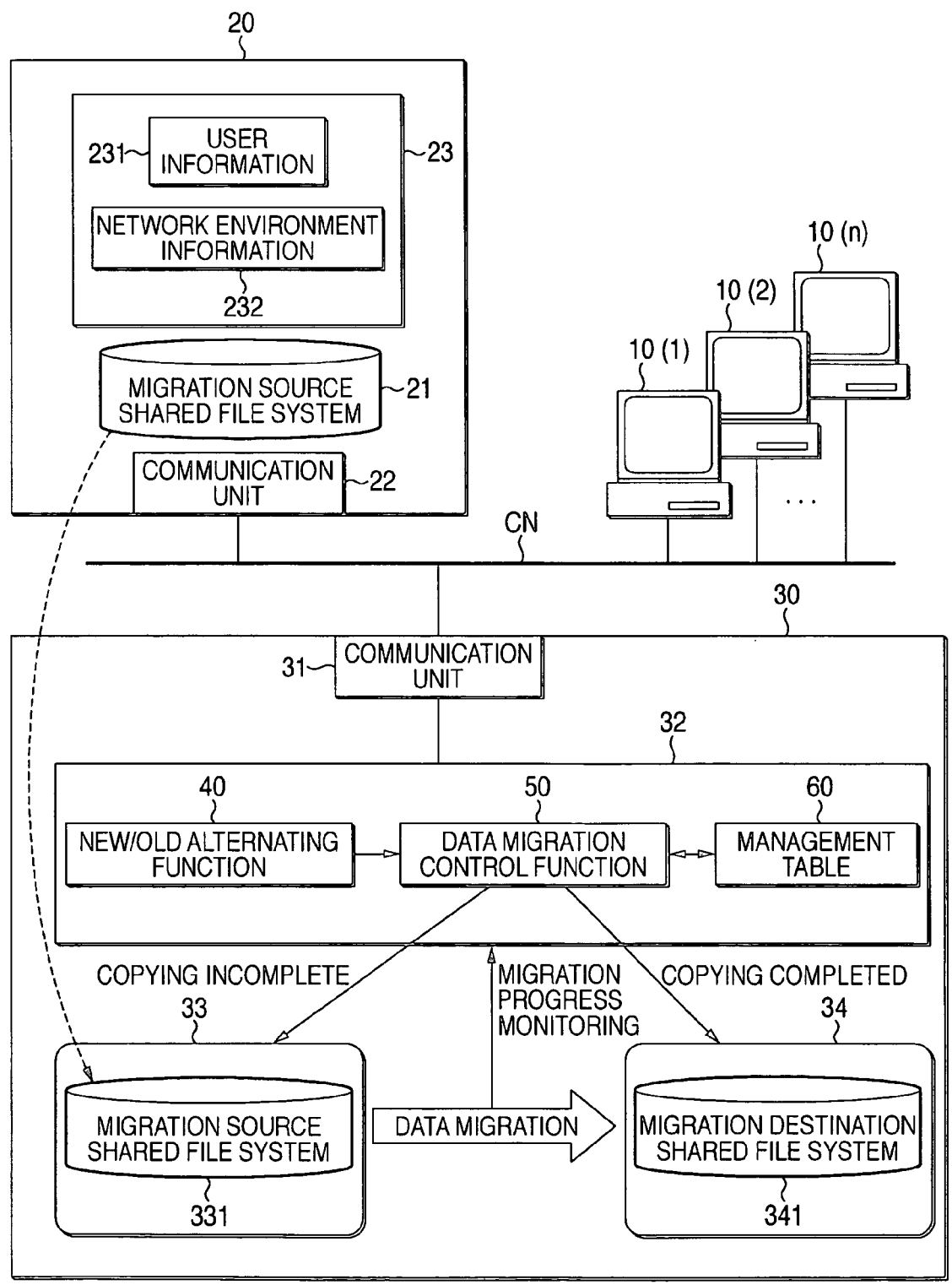
FIG. 1 is a block diagram showing the overall configuration of a file sharing system according to an embodiment of the invention.

FIG. 1 is a block diagram showing the overall configuration of the file sharing system. In this system, plural client computers 10 (1) to 10 (n), a migration source NAS 20 and a migration destination NAS 30 are interconnected via a communications network CN such as a LAN. It should be noted that, in the following description, "client computer" will be abbreviated as "client" and the reference numeral "10" will be used when no particular distinction is to be made between the clients.

Each client 10 is configured as a computer device, such as a personal computer, a work station or a portable information terminal. Application programs that use a file sharing service are respectively disposed in the clients 10. Each client 10 is connected to the communications network CN via a network interface card (NIC). For example, when high-speed data communication is necessary, an NIC with hardware acceleration that shoulders TCP/IP processing is used. Each client 10 can be dispersed and disposed in respectively different locations or can be disposed in the same location.

The migration source NAS (old NAS) 20 can be configured as a sophisticated file server specializing in file sharing services. It should be noted that the migration source NAS 20 may also be configured as an ordinary file server where a file sharing protocol is disposed on a versatile OS. The migration source NAS 20 is disposed with a migration source shared file system 21, a communication unit 22 and a storage unit 23.

The migration source shared file system 21 stores, in a hierarchy, numerous files shared by the clients 10. For example, a storage region is formed by connecting a storage device such as a hard disk drive or a semiconductor memory device with a SAN (Storage Area Network). The shared file system 21 uses the logical storage region formed on the physical storage region to store data in file units.

As described above, the communication unit 22 can be configured as an NIC with hardware acceleration. The migration source NAS 20 is connected to the communications network CN via the communication unit 22. The migration source NAS 20 provides the file sharing service to the clients 10 via the communications network CN from the communication unit 22. However, as described later, during data migration, the migration source NAS 20 is occupied by the migration destination NAS 30 so that the clients 10 cannot directly access the migration source NAS 20.

The storage unit 23 is configured as a nonvolatile semiconductor memory device. User information 231 and network environment information 232 are stored in the storage unit 23. User accounts and access rights are included in the user information 231. Each client 10 can access the files stored in the shared file system 21 on the basis of preset access rights. Whether or not the access requests from the clients 10 are permitted is determined on the basis of the user information 231. Information necessary to identify the migration source NAS 20 on the network is included in the network environment information 232.

Among the information necessary for identification are computer names (host names, etc.) and unique identification information (IP addresses, etc.). The types of information necessary for identifying respective nodes participating in the network are dependent on the communication protocol used in that network. For example, in the case of TCP/IP, the host name and unique identification information are necessary to identify the node. In a case where the specification of the communication protocol can be identified simply by the computer name, such as in NETBEUI (NetBIOS Extended User Interface) and IPX/SPX (Internetwork Packet Exchange/Sequenced Packet Exchange), the network environment information 232 may be configured to include only the computer name.

Similar to the migration source NAS 20, the migration destination NAS 30 can be configured as an ordinary file server using a versatile OS or as a sophisticated NAS. The migration destination NAS 30 is disposed with a communication unit 31, a control unit 32, a migration source storage region 33 and a migration destination storage region 34.

The communication unit 31 is configured in the same manner as the communication unit 22. The migration destination NAS 30 is connected, through the communication unit 31, to the clients 10 and the migration source NAS 20 via the communications network CN.

The control unit 32 controls the entire operation of the migration destination NAS 30. The control unit 32 can be configured to include at least one CPU (Central Processing Unit). The control unit 32 is disposed with a function 40 of alternating new and old servers (referred to below as "new/old alternating function"), a data migration control function 50 and a management table 60. The new/old alternating function 40 logically alternates the migration source NAS 20 and the migration destination NAS 30 on the network. That is, the clients 10 can connect to the migration source NAS 20 with a conventional connection setting, but the actual connection destination is the migration destination NAS 30.

The data migration control function 50 respectively executes, in parallel, processing of data migration from the migration source NAS 20 to the migration destination NAS 30 and processing of access requests from the clients 10 arising during data migration processing. The data migration control function 50 controls the data provider in correspondence to the migration status of the data. The management table 60 manages the statuses of the files during data migration. The details of the control unit 32 and the management table 60 will be discussed later.

The migration source storage region 33 is a virtual storage region that is disposed in order for data retained in the migration source shared file system 21 to be used during data migration processing. A virtual migration source shared file system 331, which is constructed by network-mounting the migration source shared file system 21, is disposed in the migration source storage region 33. The migration source storage region 33 occupies the network-mounted migration source shared file system 21. That is, during data migration processing, data of the migration source shared file system 21 can be accessed only through the migration destination NAS 30. It should be noted that the migration source storage region 33 becomes unnecessary after completion of the data migration processing.

The migration destination storage region 34 is disposed with a migration destination file system 341. The migration destination storage region 34 is a storage region for providing the clients 10 with the data that has migrated from the migration source shared file system 21. The status of data migration from the migration source storage region 33 to the migration destination storage region 34 is monitored per piece of data (file), and the control unit 32 is notified of this status.

Figure 2:
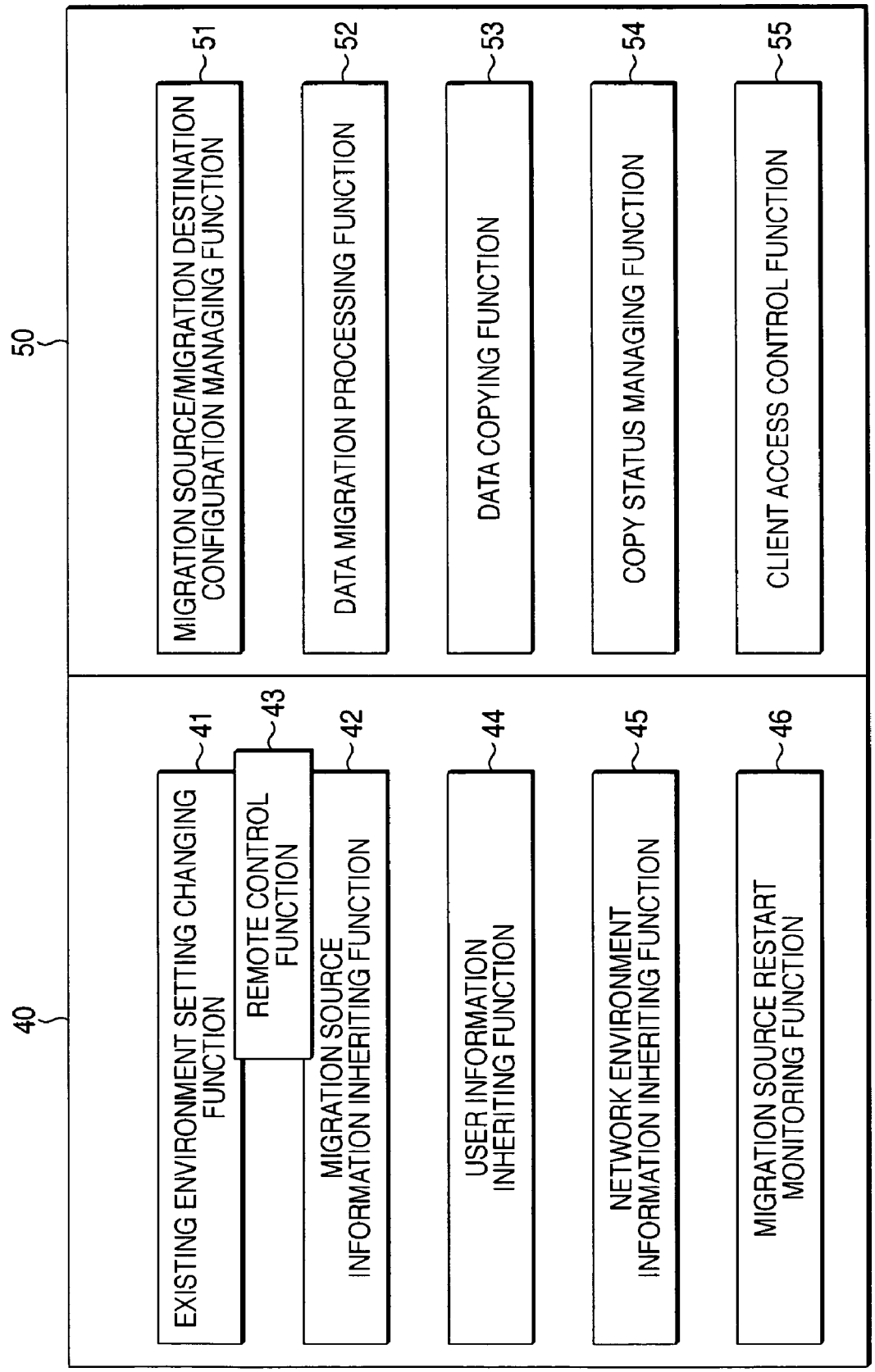
FIG. 2 is an explanatory diagram showing the functions that a migration destination NAS has.

The primary functions of the control unit 32 will now be described with reference to FIG. 2. The new/old alternating function 40 is disposed with an existing environment setting changing function 41 and a migration source information inheriting function 42 as primary functions. A remote control function 43 is a function that is used when the existing environment setting changing function 41 and the migration source information inheriting function 42 are executed. A user information inheriting function 44 and a network environment information inheriting function 45 are sub-functions of the migration source information inheriting function 42. A migration source restart monitoring function 46 is a sub-function of the existing environment setting changing function 41.

The existing environment setting changing function 41 sets the migration source NAS 20 to an occupiable state by remote control (e.g., communication using an r-command or a remote terminal protocol such as TELNET) through the communications network CN. The existing environment setting changing function 41 rewrites the network environment information of the migration source NAS 20 over other prepared information, whereby the existence of the migration source NAS 20 is hidden from the clients 10. Thus, the migration source NAS 20 becomes accessible only by the migration destination NAS 30. As a result, the migration source NAS 20 is occupied by the migration destination NAS 30.

The migration source information inheriting function 42 causes the migration destination NAS 30 to inherit the user information 231 and the network environment information 232 that the migration source NAS 20 manages. The user information inheriting function 44 causes the migration destination NAS 30 to inherit the user accounts and access rights that the migration source NAS 20 manages. By inheriting the user information, access rights management that is the same as before data migration can be conducted even after data migration. The network environment information inheriting function 44 inherits the network environment information that had been set in the migration source NAS 20. Because the migration destination NAS 30 inherits the network environment information of the migration source NAS 20, the clients 10 perceive the migration destination NAS 30 as the migration source NAS 20.

The migration source restart monitoring function 46 monitors whether or not the migration source NAS 20 has restarted in accordance with the new network environment information set by the existing environment setting changing function 41.

The data migration control function 50 is disposed with a migration source/migration destination configuration managing function (referred to below as "the configuration managing function") 51, a data migration processing function 52, a data copying function 53, a copy status managing function 54 and a client access control function 55. The configuration managing function 51 is a function that manages the file system configuration of the data region of the migration source and the file system configuration of the data region of the migration destination. The data migration processing function 52 is a function that executes, in parallel, data migration processing and processing of client access arising during data migration processing.

The data copying function 53, the copy status managing function 54 and the client access control function 55 are sub-functions of the data migration processing function 52. The data copying function 53 copies, to the migration destination shared file system 341, data stored in the migration source shared file system 21. In the case of the present embodiment, copying is executed in file units. However, depending on the case, copying may also be executed in block units. The copy status managing function 54 manages the copy status of the data—i.e., the migration status of the migration target data (files). The client access control function 55 is a function that determines the source of data provided to the client 10 when a file access request from the client 10 arises during data migration. The client access control function 5 provides, to the client 10, the requested data from one of the migration source storage region 33 and the migration destination storage region 34 on the basis of the data migration status managed by the copy status managing function 54.

Next, the various types of information managed by the management table 60 will be described on the basis of FIG. 3 and FIGS. 4A and 4B. In the present embodiment, an example of a case using TCP/IP will be described. First, FIG. 3 shows migration source/migration destination file system configuration information (referred to below as "file system configuration information").

In the file system configuration information, the name of the migration source NAS 20 (migration source host name), the migration target migration source shared file system name, the mount point when the migration source shared file system is mounted in the migration destination NAS 30, and the name of the migration destination shared file system storing the migration target data are corresponded. Also, the data migration status of each file included in the shared file system is managed in file units per migration target migration source shared file system. That is, the file name, the migration status of that file and its not-copied use frequency are corresponded.

The four types of "not copied", "being copied", "copied" and "accessing migration source" are prepared as the data migration statuses, and each piece of the migration target data has one status. Here, the "not copied" status refers to a status where copying of the data from the migration source storage region 33 to the migration destination storage region 34 has not been conducted. The "being copied" status refers to a status where copying of the data currently from the migration source storage region 33 to the migration destination storage region 34 is currently being conducted. The "copied" status refers to a status where copying of the data from the migration source storage region 33 to the migration destination storage region 34 has been completed. The "accessing migration source" status refers to a status where the data stored in the migration source storage region 33 is being used for client access because copying of the data from the migration source storage region 33 to the migration destination storage region 34 has not yet been executed. That is, the "accessing migration source" status is a status where the client 10 is accessing the migration source storage region 33 selected as the data source.

The "not-copied use frequency" is a parameter for detecting use frequency with respect to data that has not yet migrated from the migration source storage region 33 to the migration destination storage region 34. The "not-copied use frequency" represents migration demand with respect to data that has not yet migrated.

In the file system configuration information, the content of the parameter of the migration source shared file system 21 and the content of the parameter of the migration destination shared file system 341 can be set to be the same. In this case, each client 10 can use, as is, the conventionally used setting of the shared file system when accessing the migration destination NAS 30. In other words, it is possible for each client 10 to access data in the same manner as had been the case until now, without being cognizant of the fact that the shared file system has been switched. Conversely, the content of the parameter of the migration source shared file system 21 and the content of the parameter of the migration destination shared file system 341 can also be set to be different. In this case, the data can be re-disposed while the data is migrating from the migration source storage region 33 to the migration destination storage region 34. It should be noted that, in a case where the parameters of the shared file systems are made different, the clients 10 are made aware of the configuration (mount name, etc.) of the shared file system 341 that the migration destination NAS 30 has when the clients 10 access the migration destination NAS 30.

In FIG. 1, one migration source storage region 33 and one migration destination storage region 34 are shown. However, in a case where the migration source NAS 20 supports different types of file sharing protocols such as NFS (Network File System; "NFS" is a registered trademark of Sun Microsystems, Inc.) and CIFS (Common Internet File System), migration source storage regions and migration destination storage regions are respectively prepared for each file sharing protocol. For convenience of explanation, a case will be described where the clients 10 use the same file sharing protocol to utilize the file sharing service in FIG. 1. However, it goes without saying that it is possible for plural types of file sharing protocols to be supported in the present embodiment.

Next, FIG. 4A shows migration source setting change information for switching the network environment information of the migration source NAS. Network environment information of the migration source NAS 20 prior to data migration (initial network environment information) and network environment information to be switched at the time of data migration (change-use network environment information) are included in the migration source setting change information. The initial name prior to the change (server name), the initial IP address (including a subnet mask), the administrator user account name and the migration source shared file system name that the migration source NAS 20 has are included in the initial network environment information. The host name after the change, the IP address after the change (including the subnet mask) and the administrator user account name after the change are included in the change-use network environment information.

The client 10 identifies the access destination on the basis of the host name and the IP address. As shown in the migration source setting change information, the migration source NAS 20 becomes hidden from the network by changing the host name and IP address of the migration source NAS 20 data migration. The changed host name and IP address are grasped only by the migration destination NAS 30. Thus, the only device that can actually directly access the migration source NAS 20 is the migration destination NAS 30, and the migration source NAS 20 is occupied by the migration destination NAS 30.

FIG. 4B shows temporary setting information of the migration destination NAS 30 prior to data migration. The migration destination NAS 30 inherits the network environment information of the migration source NAS 20 during data migration, whereby the migration destination NAS 30 is disguised with respect to the clients 10 as if it were the migration source NAS 20. Before the migration destination NAS 30 inherits the network environment information of the migration source NAS 20, it is necessary for other network environment information different from this to be set in the migration destination NAS 30. Temporary network environment information used in order to make a temporary launch at a preliminary stage of data migration is preregistered in the temporary setting information. A temporary host name, a temporary IP address and a temporary subnet mask are included in the temporary network environment information.

It should be noted that host names and IP addresses are included in the migration source setting change information and the temporary setting information, but these are dependent on the communication protocol that is used (in the present embodiment, TCP/IP). Thus, depending on the specification of the communication protocol, in a case where just the host name is sufficient, it is not necessary to set unique identification information for clearly identifying the device on the network, such as an IP address.

Due to the above configuration, the clients 10 that had been accessing the migration source NAS 20 and using the file sharing service can access the migration destination NAS 30 and continue to use the file sharing service without making special setting changes during and after data migration.

In a case where an access request from the clients 10 arises while the data is migrating from the migration source NAS 20 to the migration destination NAS 30, the client access control function 55 determines the migration status of the requested data. In a case where the data requested by the clients 10 has already been copied to the migration destination storage region 34 and can be used, the client access control function 55 provides the data stored in the migration destination storage region 34 to the clients 10. In a case where the data requested by the clients 10 has not yet been copied to the migration destination storage region 34, the client access control function 55 provides the data stored in the migration source storage region 33 to the clients 10. Thus, each client 10 can obtain the desired data simply by accessing the migration destination NAS 30, even in a case where data migration has been completed or in a case where data migration has not been completed.

Figure 5:
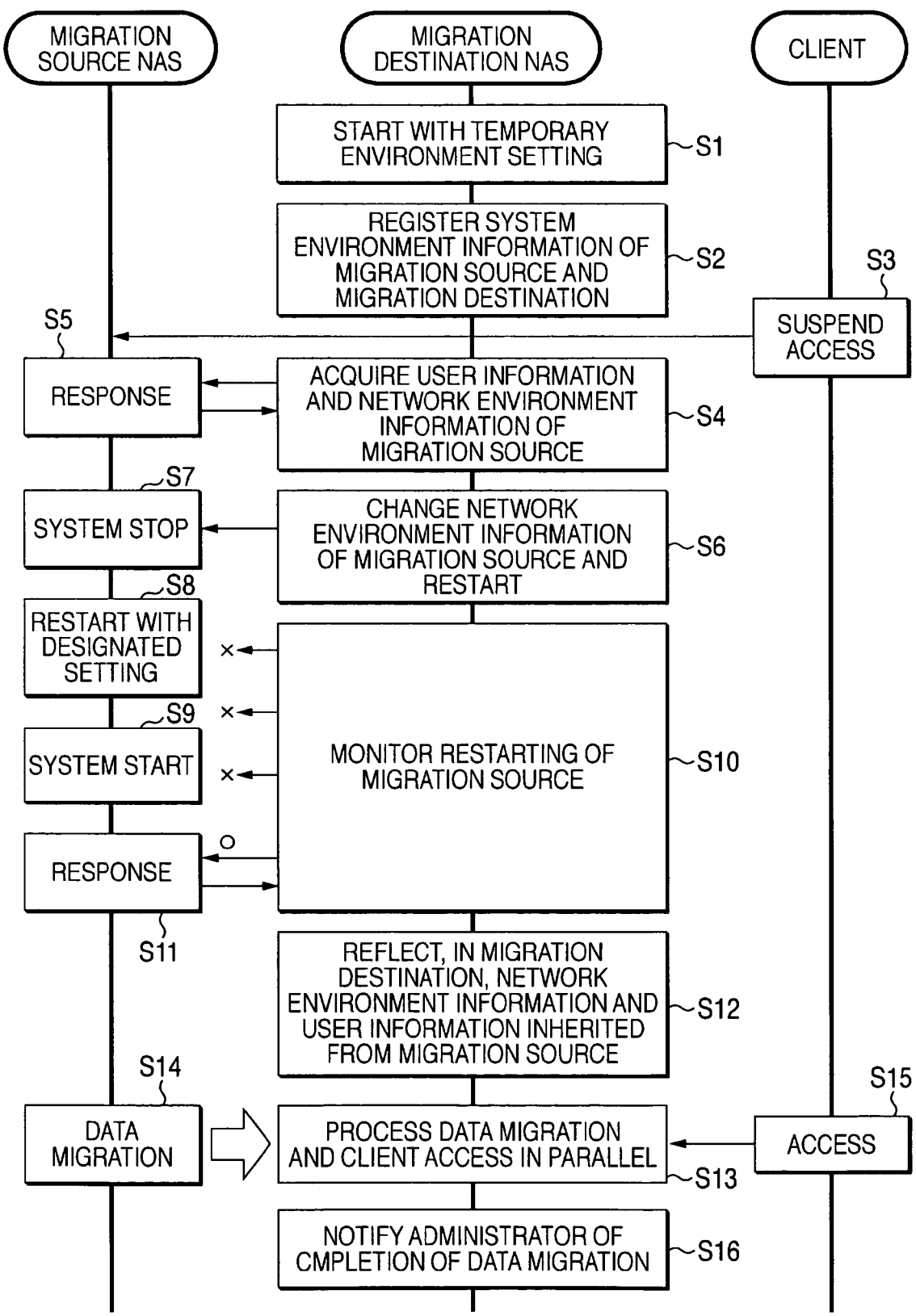
FIG. 5 is a flow chart schematically showing the overall operation of a data migration method.

FIG. 5 is a flow chart showing the overall flow of the method by which data migrates between the NAS 20 and the NAS 30. First, the migration destination NAS 30 starts on the basis of the temporary network environment information shown in FIG. 4B (S1). Thus, preparation for inheriting the network environment information from the migration source NAS 20 is completed. The migration destination NAS 30 is recognized on the network as a device having the host name "FS1 target" and the IP address "192.168.100.10". Next, the data migration configuration of the migration source NAS 20 and the migration destination NAS 30 and information necessary for carrying out data migration such as the system environment information are registered (S2). Next, access by the clients 10 accessing the migration source NAS 20 is temporarily suspended (S3).

The migration destination NAS 30 acquires, by remote control via the communications network CN, the user information 231 and the network environment information 232 that are to be inherited from the migration source NAS 20 (S4). The migration source NAS 20 responds with respect to the information acquisition request from the migration destination NAS 30 (S5). Next, the migration destination NAS 30 changes, by remote control via the communications network CN, the network environment information of the migration source NAS 20 to the change-use network environment information shown in FIG. 4A; and restarts the migration source NAS 20 using a reboot command (S6). In the present embodiment, a case is described where only the network environment information of the migration source NAS 20 is changed, but the user information of the migration source NAS 20 may also be changed as needed. The network environment information of the migration source NAS 20 is changed from the initial network environment information to the change-use network environment information and the migration source NAS 20 is restarted, whereby the migration destination NAS 30 can occupy the migration source NAS 20.

The migration source NAS 20 stops the system in accordance with the restart request from the migration destination NAS 30 (S7), and restarts on the basis of the designated network environment information (S8). When the system of the migration source NAS 20 is restarted (S9), the migration source NAS 20 responds with respect to the restart monitoring from the migration destination NAS 30 (S10, S11).

In other words, after the migration destination NAS 30 instructs the migration source NAS 20 to restart (S6), it monitors whether or not the migration source NAS 20 has normally restarted on the basis of the designated network environment information (S10). This monitoring can be conducted by the migration destination NAS 30 continually calling, in relatively short cycles, on the host name and IP address designated by the change-use network environment information.

When the migration destination NAS 30 confirms that the migration source NAS 20 has restarted, the user information and the network environment information (initial network environment information) acquired from the migration source NAS 20 is reflected in the migration destination NAS 30 (S12) The network environment information of the migration destination NAS 30 is changed to the network environment information of the migration source NAS 20, whereby the migration destination NAS 30 is perceived on the communications network CN as the migration source NAS 20.

Due to the above processing, preparation for initiating data migration is completed. The migration destination NAS 30 network-mounts the shared file system 21 of the migration source NAS 20 and occupies the migration source NAS 20. The migration destination NAS 30 copies and migrates the data of the mounted migration source shared file system 331 to the migration destination shared file system 341 (S13, S14).

Even during data migration, the file sharing service is provided to the clients 10 without being stopped. The clients 10 can request access to data without being cognizant of whether the desired data is located in the migration source storage region 33 or the migration destination storage region 34. The clients 10 can also request access to data without being cognizant of the migration status of the desired data. In a case where an access request from the client 10 arises during data migration (S15), the migration destination NAS 30 selects one of the storage regions 33 and 34 in correspondence to the data migration status and provides the client 10 with the requested data. That is, the migration destination NAS 30 independently executes, in parallel, the data migration processing and the processing of access from the client 10 (S13) The details of S13 will be described later.

Additionally, in a case where data migration from the migration source NAS 20 to the migration destination NAS 30 has been completed, the system administrator is notified that data migration has been completed (S16). This notification can be conducted using, for example, electronic mail. After the completion of data migration, the migration source NAS 20 becomes unnecessary because the migration destination NAS 30 provides the file sharing service. The migration source NAS 20 can be used for other services. Alternatively, the migration source NAS 20 may be used as a backup server.

Figure 6:
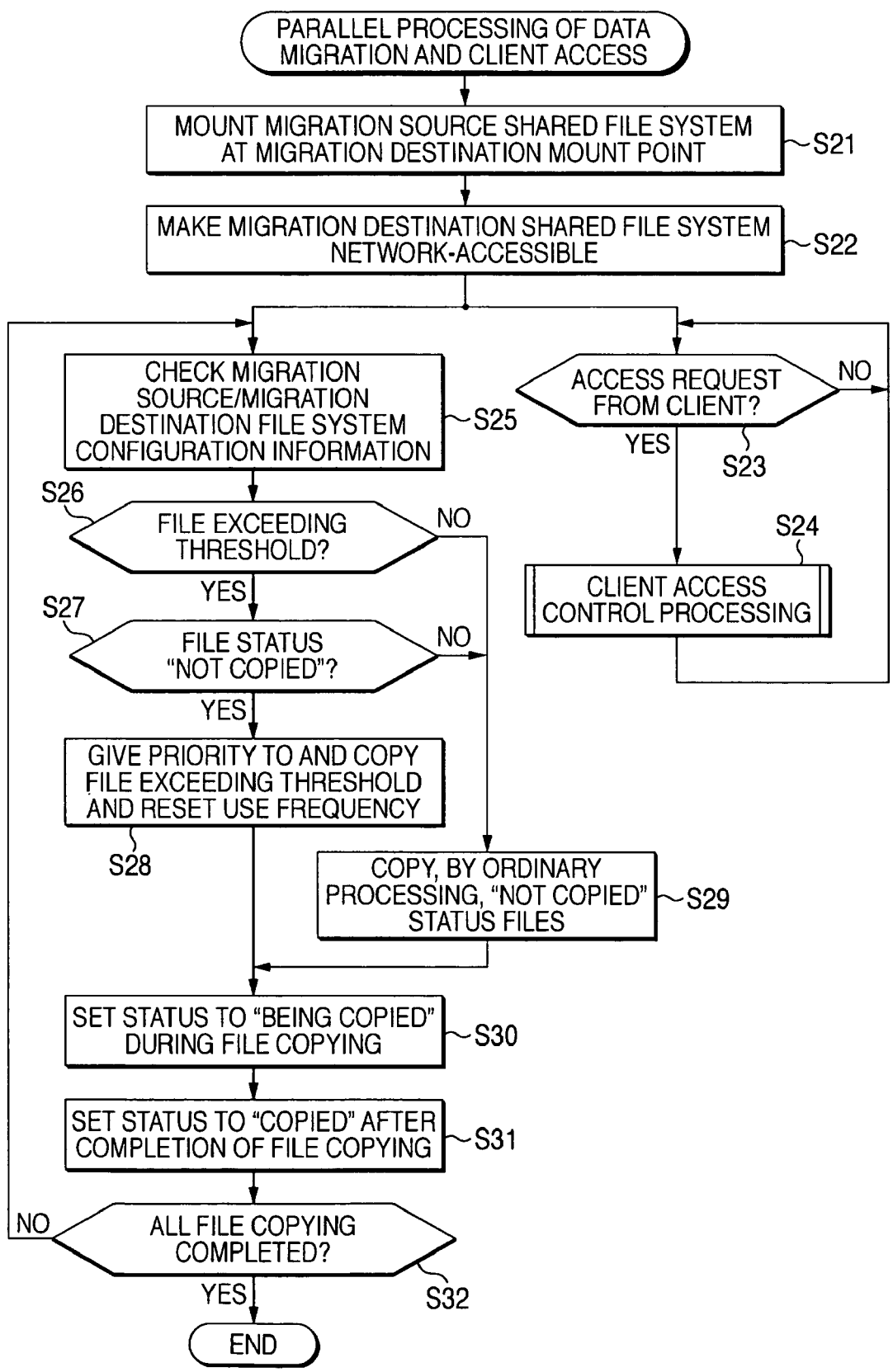
FIG. 6 is a flow chart showing data migration processing and client access processing.

FIG. 6 is a flow chart showing the details of S13 in FIG. 5. First, the migration destination NAS 30 mounts the migration source shared file system 21 at a preset migration destination mount point (S21). Next, the migration destination NAS 30 makes the migration destination shared file system 341 network-accessible (S22). Thus, the clients 10 can access the storage region of the migration destination NAS 30 via the communications network CN.

Additionally, below-described data migration processing (S25 to S32) and client access processing (S23, S24) are independently conducted in parallel. First, attention will be given to the client access processing. The migration destination NAS 30 monitors whether or not an access request from the clients 10 has arisen during data migration (S23). In a case where an access request from the clients 10 has arisen, the migration destination NAS 30 provides the clients 10 with the data in correspondence to the migration status of the requested data (S24). The details of the client access control processing shown in S24 will be described later.

Turning now to the data migration processing, the migration destination NAS 30 checks the file system configuration information shown in FIG. 3 (S25). The migration destination NAS 30 determines whether or not data exceeding a predetermined threshold is present by checking the not-copied use frequency in the file system configuration information (S26) Because data whose not-copied use frequency exceeds the predetermined threshold is not present at the early stage of data migration (S26: NO), data is copied to the migration destination storage region 34 in a predetermined order beginning with data (files) that have not yet been copied (S29) Data waiting to be copied can be grasped by checking the "status" in the file system configuration information. With respect to data for which copying has started from the "not copied" status, the "being copied" status is given thereto and registered in the file system configuration information (S30). When copying is completed, the status of the copied data is changed from "being copied" to "copied" (S31). The processing of S25 to S31 is repeated until copying is completed with respect to all of the designated migration target data (S32). When all of the migration target data has migrated (S32: YES), data migration processing ends.

In cases where there are no or few access requests from the clients 10 during data migration, only the processing of S25, S26, S29, S30, S31 and S32 is repeated. However, in a case where a relatively large number of access requests have arisen from the clients 10 during data migration, the not-copied use frequency of the data waiting to be copied is counted up each time that data is requested by the clients 10. In a case where, for example, access requests from the clients 10 are evenly dispersed in data groups of the "not copied" status and none of the not-copied use frequencies of the data exceeds the predetermined threshold, priority copying is not initiated.

However, in a case where the access requests from the clients 10 are concentrated in regard to specific data, the not-copied use frequency of that data exceeds the predetermined threshold (S26: YES). In a case where the status of data having a large access demand is "not copied" (S27: YES), the initial order is superceded and that data is placed at the top of a queue so that it is given priority and copied to a predetermined position in the migration destination storage region 34 beginning with data having a high not-copied use frequency (S28). Then, the not-copied use frequency of the data for which priority copying has been designated is reset (S28). While the data for which priority copying has been designated is being copied, the status of that data is changed to "being copied" (S30). In a case where copying has been completed, the status of that data is changed to "copied" (S31).

A case where data whose not-copied use frequency exceeds the predetermined threshold has a status other than "not copied" (S27: NO) is a case where data with a high use frequency is of the status "accessing migration source". That is, because the use frequency is high, it is situation where the data is being continuously accessed by the clients 10 without there being time to copy the data. In this case, the data is successively migrated to the migration destination storage region 34 in accordance with the initial order beginning with data of the "not copied" status (S29).

In a case where access to the same data is continually requested by the same client 10, the not-copied use frequency can be counted up or the system can be configured to not accept continuous access from the same client 10.

Figure 7:
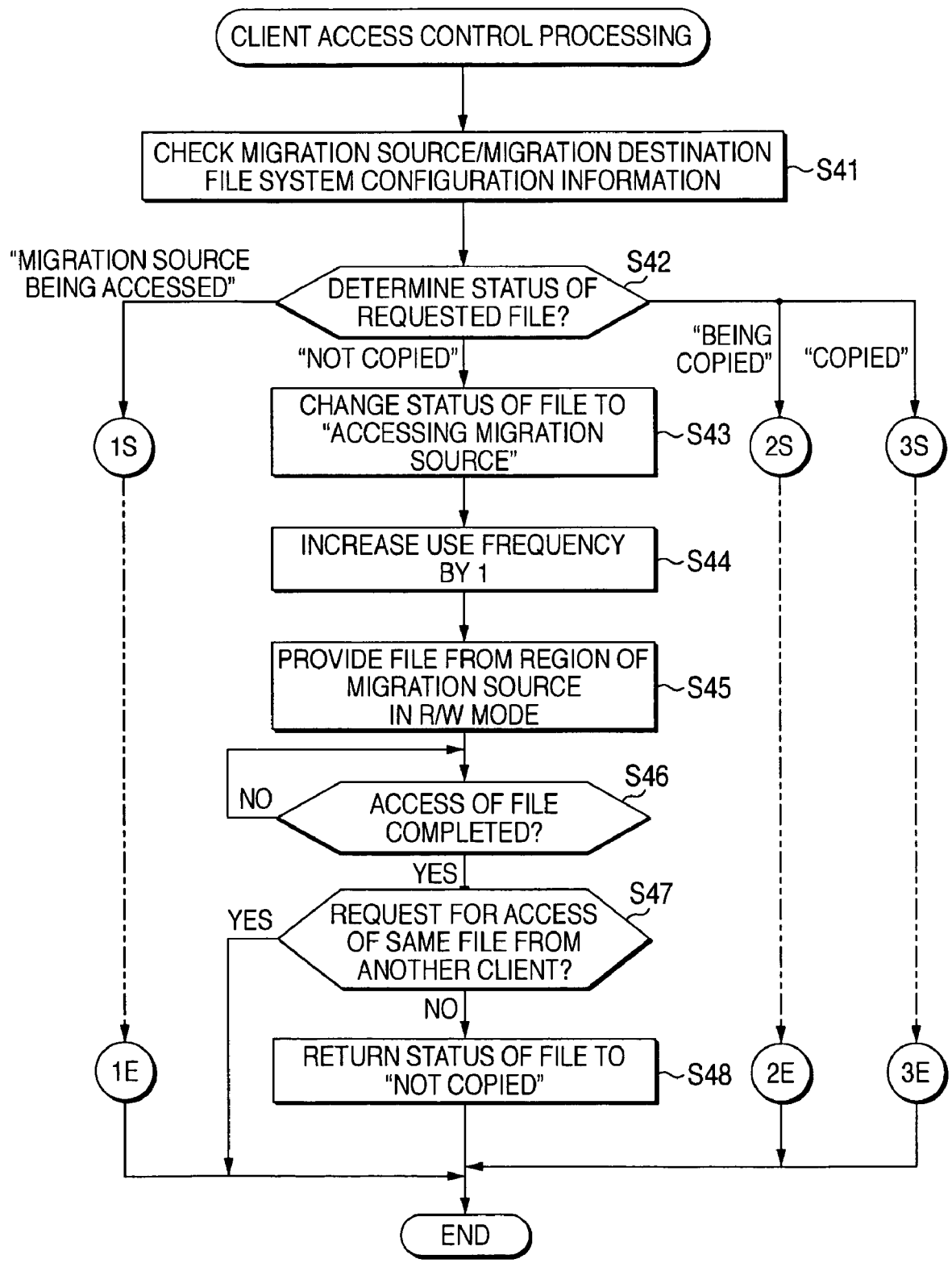
FIG. 7 is a flowchart showing the details of client access control processing of FIG. 6.
Figure 8:
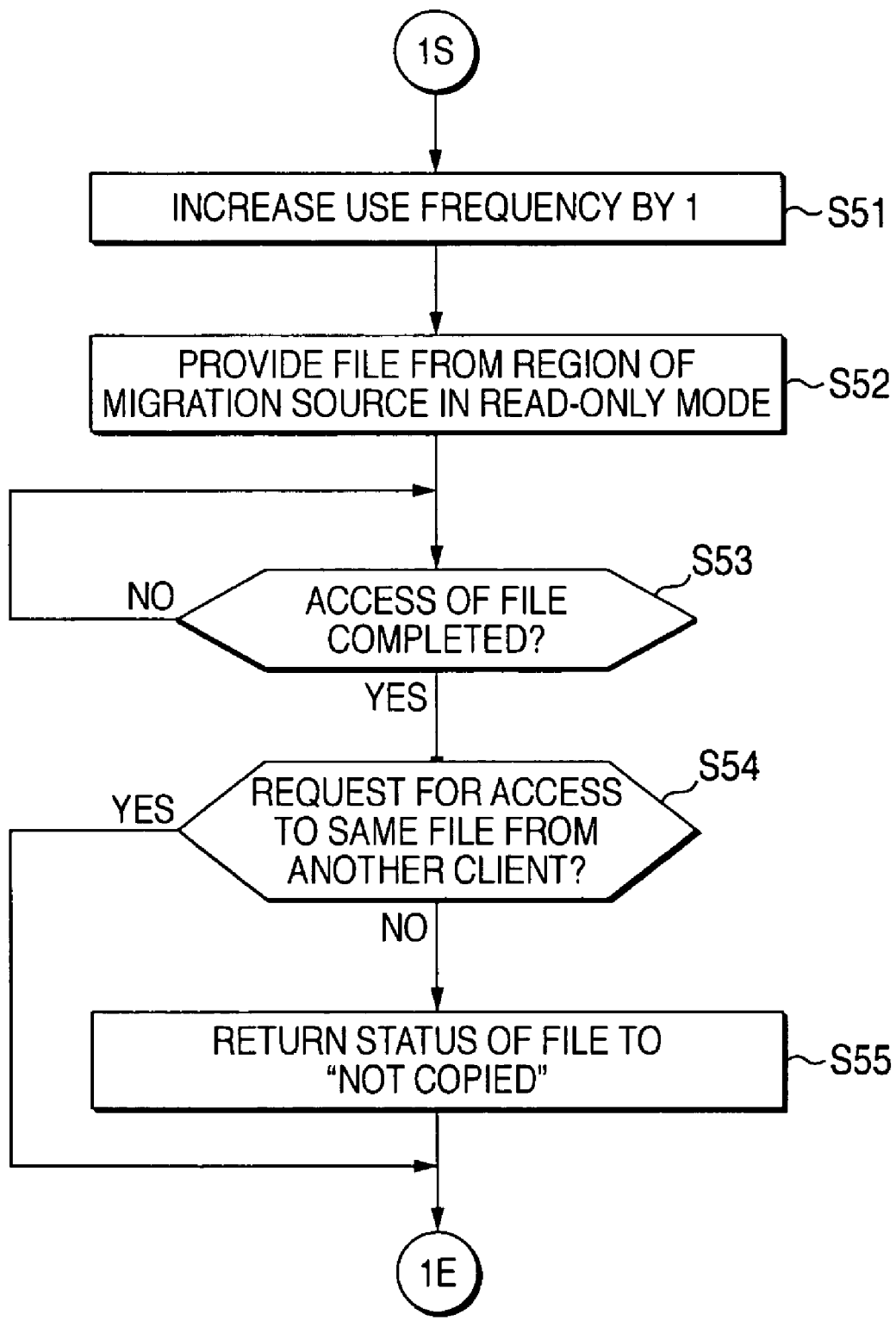
FIG. 8 is a continuation of the flow chart of FIG. 7.

FIG. 7 is a flow chart showing the details of the client access control processing (S24) of FIG. 6. When access is requested by any of the clients 10 during data migration, the migration destination NAS 30 checks the file system configuration information (S41). The migration destination NAS 30 determines whether the status of the data to which access has been requested by the client 10 corresponds to "not copied", "being copied", "copied" or "accessing migration source" (S42). Processing thereafter differs in correspondence to the status of the data.

In a case where the status of the data to which access has been requested by the client 10 is "not copied", the migration source NAS 30 changes the status of that data from "not copied" to "accessing migration source" (S43), as shown in FIG. 7. The migration destination NAS 30 also increments the value of the not-copied use frequency of the requested data by 1 (S44). Then, the migration destination NAS 30 provides the data requested by the client 10 in a read/write mode from the migration source storage region 33 (S45). The migration destination NAS 30 monitors whether or not access by the client 10 has been completed (S46). In a case where access by the client 10 has been completed (S46: YES), the migration destination NAS 30 determines whether or not access to the same data is being requested by another client 10 (S47). In a case where an access request from another client 10 has not arisen (S47: NO), the migration destination NAS 30 returns the status of the data from "accessing migration source" to "not copied" and ends the processing (S48) In a case where an access request from another client 10 has arisen (S47: YES), the migration source NAS 30 ends the processing with the status of the data remaining set to "accessing migration source".

It should be noted that, although description in regard to access rights management is omitted from the drawings, the migration destination NAS 30 conducts access rights management on the basis of the user information 231 inherited from the management source NAS 20. Thus, clients 10 that do not have access rights cannot access data where access control has been set. Also, in S45, a case was described where the data was provided from the migration source storage region 33 to the client 10 (having an access right) in the read/write mode. However, in a case where, for example, the access right of the client 10 is read-only, the data is supplied in a read-only mode.

Next, client access processing in a case where the status of the data to which access has been requested by the client 10 is "accessing migration source" will be described. As shown in the flow chart of FIG. 8, in a case where access to data (whose status is "accessing migration source") that is being accessed by a certain client 10 is requested by another client 10, the migration destination NAS 30 increments the not-copied use frequency by 1 (S51).

Additionally, the migration destination NAS 30 provides the client 10 with the requested data from the migration source storage region 33 in the read-only mode (S52). The reason the data is presented in the read-only mode is in order to prevent mismatching of the data because the data is being used by another client 10 (first client) that had previously accessed that data. The migration destination NAS 30 monitors whether or not access by the client 10 (second client) has been completed (S53). In a case where access by the second client 10 has been completed (S53: YES), the migration destination NAS 30 determines whether or not access to the same data is being requested by yet another client 10 (third client) (S54). In a case where an access request from the third client 10 has not arisen (S 54: NO), the migration destination NAS 30 returns the status of the data from "accessing migration source" to "not copied" and ends the processing (S55).

In a case where an access request from the third client 10 has arisen (S54: YES), the migration destination NAS 30 ends processing with the status of the data remaining as "accessing migration source". The not-copied use frequency of the data to which access has been continuously requested by plural clients 10 is increased in increments of 1 and exceeds the predetermined threshold. Data having a not-copied use frequency exceeding the predetermined threshold is given priority over other not-copied data and copied from the migration source storage region 33 to the migration destination storage region 34.

Figure 9:
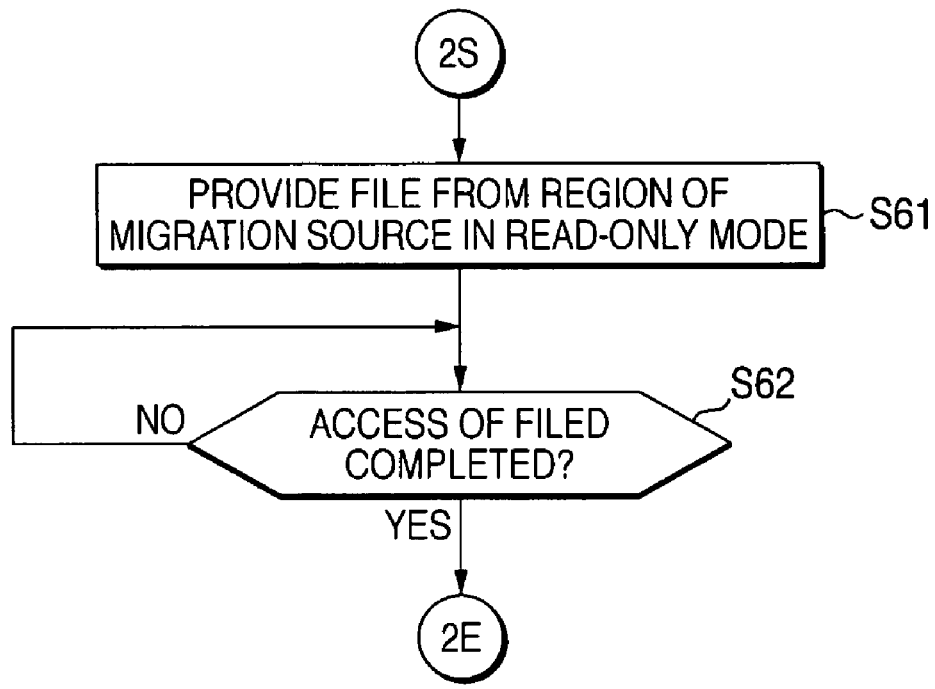
FIG. 9 is another continuation of the flow chart of FIG. 7.

Client access processing in a case where the status of the data to which access has been requested by the client 10 is "being copied" will be described on the basis of FIG. 9. In a case where access to data having the "being copied" status has been requested by the clients 10, the migration destination NAS 30 provides the requested data from the migration source storage region 33 to the client 10 in the read-only mode (S61). The reason the data is presented in the read-only mode is to prevent mismatching of the data. The migration destination NAS 30 monitors whether or not access by the client 10 has been completed (S62), and ends the processing when access has been completed (S62: YES).

Figure 10:
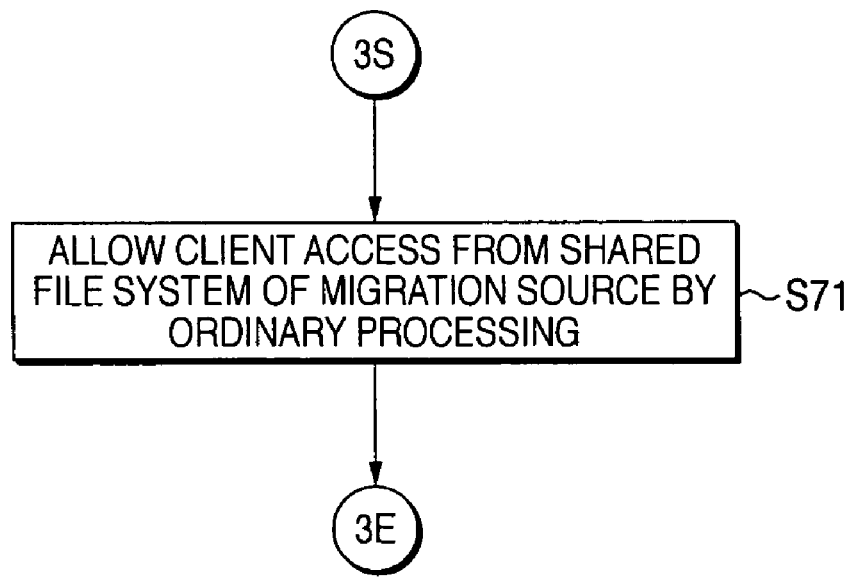
FIG. 10 is yet another continuation of the flow chart of FIG. 7.

Client access processing in a case where the status of the data to which access has been requested by the client 10 is "copied" will be described on the basis of FIG. 10. In this case, the data requested by the client 10 is already stored in a predetermined place in the migration destination storage region 34. Thus, the migration destination NAS 30 provides the data requested by the client 10 to the client 10 from the migration destination storage region 34 and ends the processing (S71).

Figure 11:
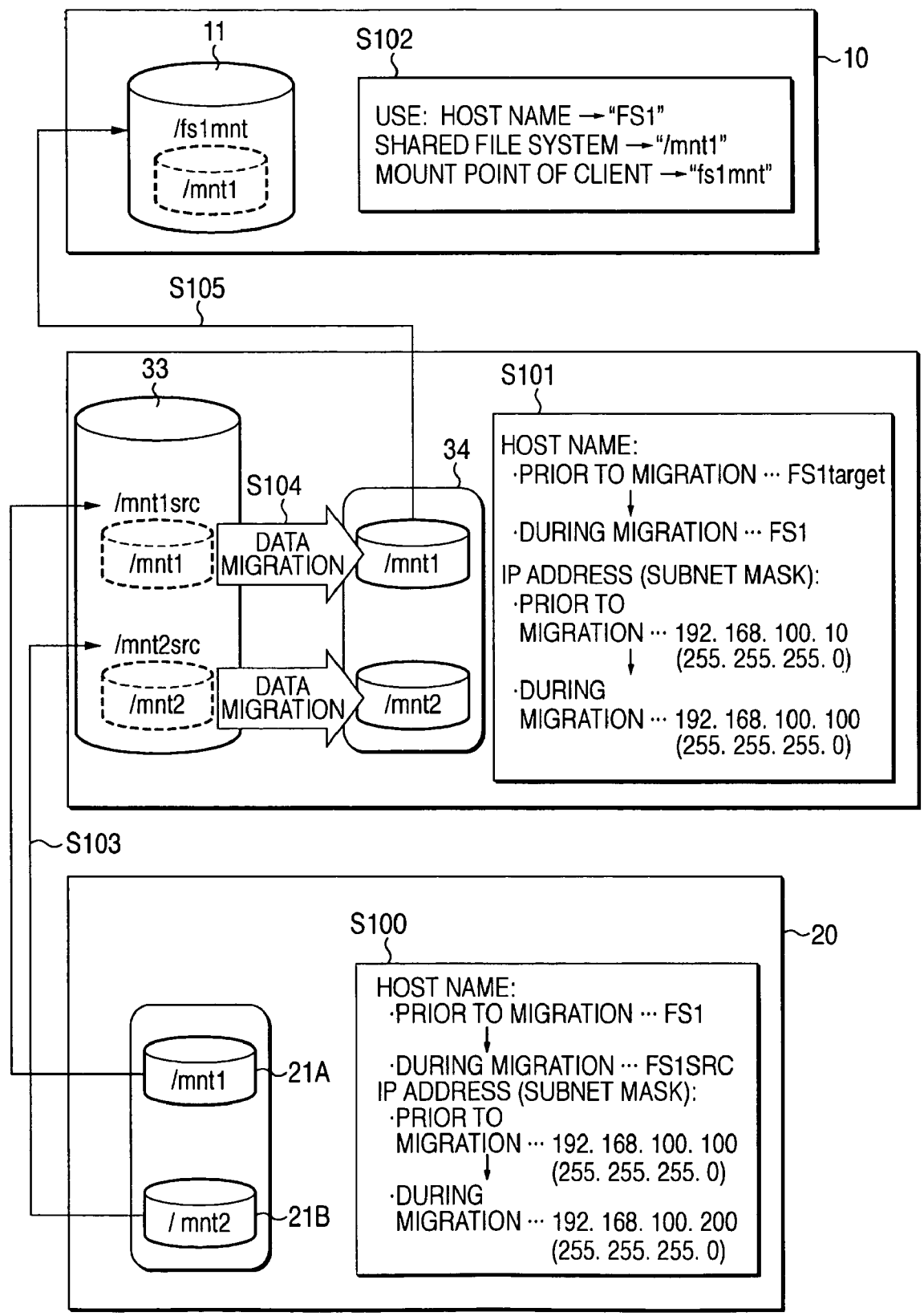
FIG. 11 is an explanatory diagram schematically showing the switching of network environment information of a migration source NAS and the migration destination NAS.

A specific example of the above data migration method will be described on the basis of FIG. 11. FIG. 11 is a schematic diagram showing the relation between the migration source NAS 20, the migration destination NAS 30 and the client 10. In the following description, the migration source NAS 20 is disposed with plural shared file systems "/mnt1" and "/mnt2". Thus, the migration destination NAS 30 is also disposed with plural shared file systems. Each shared file system can be configured to provide services according to respectively different file sharing protocols. Depending on the case, it is also possible to consolidate the plural shared file systems that the migration source NAS 20 has into one shared file system in the migration destination NAS 30. In this case, it is necessary to notify the client 10 of the change in the file sharing environment before the file sharing service is provided from the migration destination NAS 30.

The host name of the migration source NAS 20 prior to data migration is "FS1" and the IP address is "192.168.100.100". At a preliminary stage before data migration begins, the network environment information of the migration source NAS 20 is changed so that the host name is changed from "FS1" to "FS1SRC" and the IP address is changed from "192.169.100.100" to "192.168.100.200". The migration source NAS 20 restarts with the network environment information designated by the migration destination NAS 30 (S100). Thus, only the migration destination NAS 30 perceives the presence of the migration source NAS 20.

When the migration destination NAS 30 confirms that the network environment information of the migration source NAS 20 has been switched, the migration destination NAS 30 switches its own parameters to the parameters that had been initially set in the migration source NAS 20. Assuming that the host name of the migration destination NAS 30 at the time of temporary launch is "FS1 target" and the IP address is "192.168.10", the migration destination NAS 30 changes the host name from "FS1 target" to "FS1" and changes the IP address from "192.168.10" to "192.168.100.100". Thus, the migration destination NAS 30 is recognized on the communications network as the migration source NAS 20.

Prior to data migration, the client 10 mounts the shared file system "/mnt1" whose host is "FS1" on the mount point "fs1mnt". That is, prior to migration, the client 10 network-mounts and uses the shared file system "/mnt1" that the migration source NAS 20 has (S102).

The migration destination NAS 30 network-mounts the shared file systems 21A and 21B that the migration source NAS 20 has on the basis of the user information inherited from the migration source NAS 20 (S103). In this case, the user account "admin" for exercising the management right is used in the migration source NAS 20. In the drawing, the shared file system 21A ("/mnt1") of the migration source NAS 20 is mounted on the mount point "/mnt1src", and the shared file system 21B ("/mnt2") of the migration source NAS 20 is mounted on the mount point "/mnt2src".

The migration destination NAS 30 copies the data of the shared file system mounted in the migration source storage region 33 to the shared file system of the migration destination storage region 34, whereby the data migrates (S104). The name of the migration destination shared file system is set to be the same as the name of the migration source shared file system. Thus, when the shared file system is accessed, the connection destination of the client 10 becomes the migration destination NAS 30 with the client 10 maintaining its prior setting (S105). That is, the client 10 network-mounts the shared file system of the migration destination NAS 30 instead of the shared file system of the migration source NAS 20 without being cognizant of this.

Figure 12:
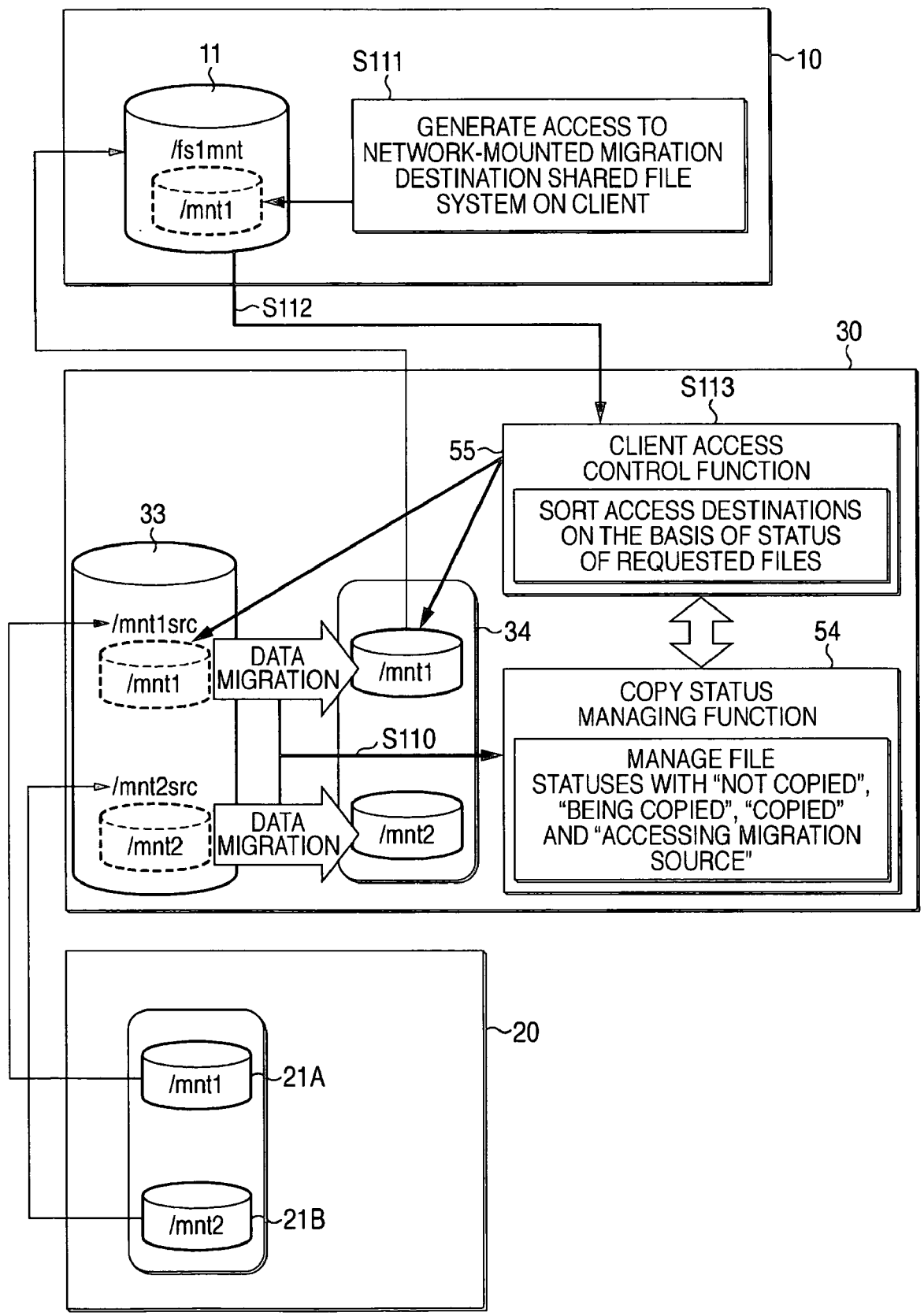
FIG. 12 is an explanatory diagram schematically showing a condition where client access arising during data migration processing is processed.

FIG. 12 is a schematic diagram showing a state where data migration processing and client access processing are executed in parallel. The migration destination NAS 30 uses the copy status management function 54 to monitor and grasp, per each piece of data (per file), the migration status of the data from the migration source storage region 33 to the migration destination storage region 34 (S110). It will be assumed that, during data migration processing, a request from the client 10 for access to the network-mounted migration source shared file system has arisen in the client 10 (S111). The access request from the client 10 is transmitted to the migration destination NAS 30 rather than to the migration source NAS 20 (S112).

The migration destination NAS 30 uses the client access control function 55 to process the access request from the client 10 (S113). The client access control function 55 references the data migration status grasped by the copy status management function 54 to confirm the migration status of the data to which access has been requested by the client 10. In a case where the data requested by the client 10 has already migrated, the client access control function 55 provides the data to the client 10 from the migration destination storage region 34. In a case where the data requested by the client 10 has not yet migrated, the client access control function 55 provides the data to the client 10 from the migration source storage region 33.

Figure 13:
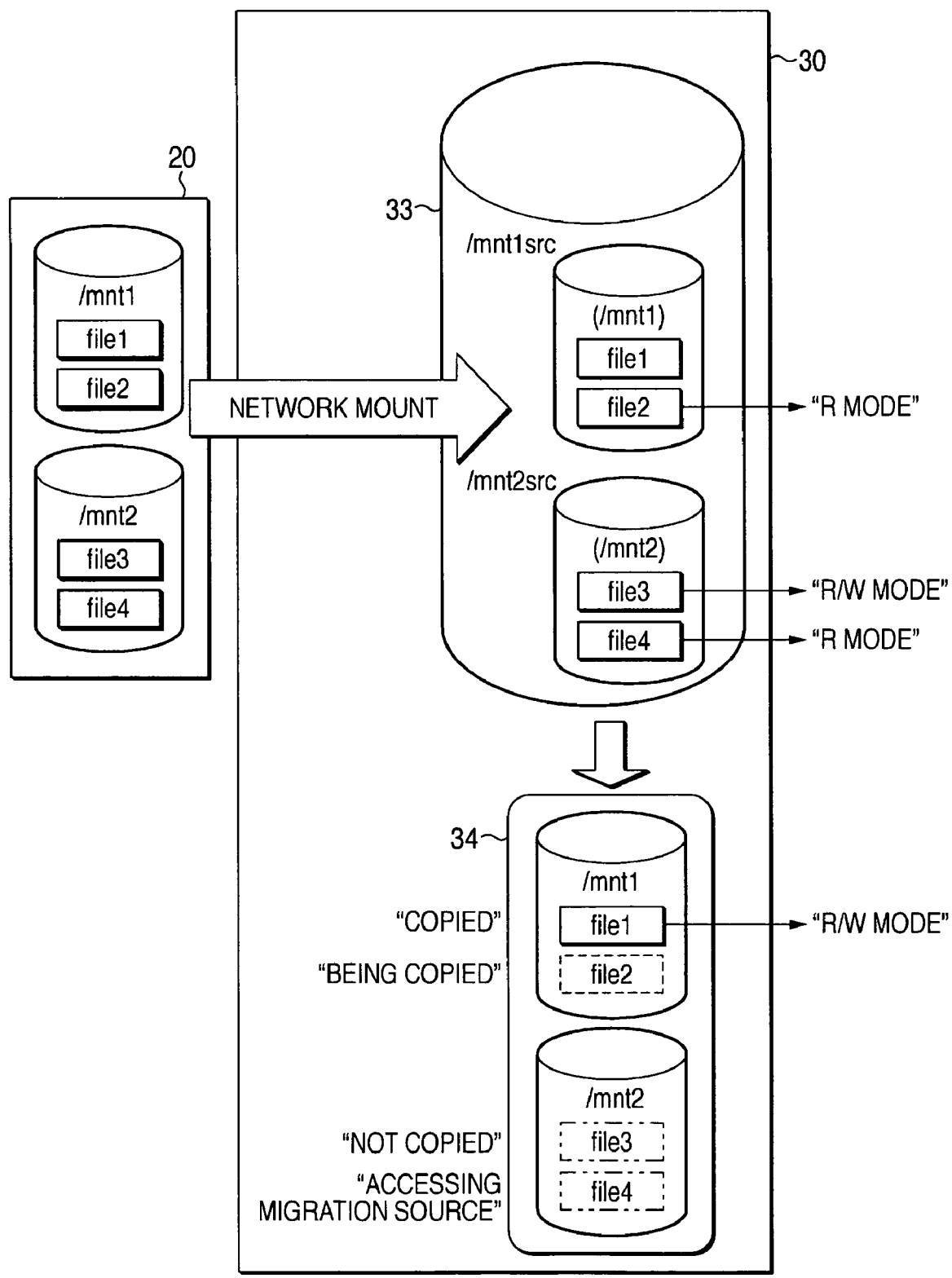
FIG. 13 is a schematic diagram showing a state where a file sharing system provided to the client is selected in accordance with the status of data migration.

FIG. 13 is a schematic diagram showing a state where the shared file system provided to the client 10 is switched by the migration situation of the data. It will be assumed that the client 10 has an access right for accessing the data. It will also be assumed that the migration source NAS 20 has two shared file systems "/mnt1" and "/mnt2", that a "file1" and a "file2" are stored in "/mnt1", and that a "file3" and a "file4" are stored in "/mnt2".

The shared file systems of the migration source NAS 20 are network-mounted in the migration source storage region 33 of the migration source NAS 30. "/mnt1" is mounted on the mount point "/mnt1src" and "/mnt2" is mounted on the mount point "/mnt2src". Two shared file systems "/mnt1" and "/mnt2", which respectively correspond to the shared file systems of the migration source NAS 20, are formed in the migration destination storage region 34 of the migration destination NAS 30.

Here, it will be assumed that "file1" has already been copied from the migration source storage region 33 to the migration destination storage region 34 ("copied" status). It will also be assumed that "file2" is being copied from the migration source storage region 33 to the migration destination storage region 34 ("being copied" status). It will also be assumed that "file3" has not yet been copied from the migration source storage region 33 to the migration destination storage region 34 ("not copied" status). And it will be assumed that "file4" has not yet been copied from the migration source storage region 33 to the migration destination storage region 34 and is being accessed by a certain client 10 ("accessing migration source" status). When the client 10 requests access to "file1" to "file4" under these conditions, "file1" is provided to the client 10 from the migration destination storage region 34 in the read/write mode (R/W mode) because it has already been copied. In a case where the client 10 requests access to "file2", "file2" is provided to the client 10 from the migration source storage region 33 in the read-only mode (R mode) because it is being copied. In a case where the client 10 requests access to "file3", "file3" is provided to the client 10 from the migration source storage region 33 in the read/write mode because it is not present in the migration destination storage region 34. In a case where the client 10 accesses "file4", "file4" is provided to the client 10 from the migration source storage region 33 in the read-only mode because it is being accessed by another client 10 in the migration source storage region 33.

The present embodiment is configured in this manner and can process access from the clients 10 while causing the data to migrate from the existing NAS 20 to the new NAS 30.

Also, in the present embodiment, because data migration processing and client access processing can be independently executed in parallel, the file sharing service can be provided to the clients 10 with a relatively high responsiveness even during the data migration processing. In particular, because data that has not yet been copied to the migration destination NAS 30 is provided to the client 10 from the migration source NAS 20 rather than being provided to the client 10 after being copied to the migration destination NAS 30, the responsiveness can be raised.

Also, because data migration processing is initiated after the user information and the system environment information have been inherited, access from the clients 10 can be processed even during data migration.

Moreover, in the present embodiment, because the demand with respect to data that has not yet been copied to the migration destination NAS 30 is investigated so that data with a high access frequency is given priority and caused to migrate, data can be rapidly migrated to the migration destination NAS 30 beginning with data whose actual demand is large. Thus, data whose use frequency is high can be rapidly provided from the migration destination NAS 30.

Also, in the present embodiment, because the network environment information of the migration source NAS 20 is switched and the migration destination NAS 30 inherits the network environment information that had been initially set in the migration source NAS 20, the migration destination NAS 30 can be disguised as if it were the migration source NAS 20 without changing the physical network configuration. Thus, the clients 10 can access the shared file system with their prior settings without having to change any settings.

Moreover, in the present embodiment, because selection of the shared file system provided to the clients 10 and selection of the method of provision (read/write mode or read-only mode) are conducted in correspondence to the four types of data migration status (the "not copied" status, the "being copied" status, the "copied" status and the "accessing migration source" status), data can be appropriately provided in correspondence to the migration status of the data.

Also, in the present embodiment, because whether or not the migration source NAS 20 has restarted is monitored on the basis of new network environment information and the network environment information of the migration destination NAS 30 is updated after it has been confirmed that the migration source NAS 20 has restarted, adverse affects accompanying the switching of the network environment information can be prevented.

It should be noted that the present invention is not limited to the above-described embodiment. A person skilled in the art can make various additions or changes within the scope of the invention.

What is claimed is:

1. A migration destination file sharing device communicably connected to a migration source file sharing device and a host computer via a communications network, the migration destination file sharing device including:
    means for relating a plurality of migration source shared file systems of the migration source file sharing device to plurality of migration destination shared file systems of the migration destination file sharing device by shared file system basis and for determining a mount point for network-mounting one of the migration source shared file systems of the migration source file sharing device, which is migration-related to the shared file systems of the migration destination file sharing device, as a migration source shared file system onto the migration destination file sharing device, and the migration source shared file systems each having a plurality of files;
    means for migrating files from the migration source file sharing device to the migration destination file sharing device on a file by file basis per shared file system;
    means for setting or changing a migration status of each file;
    means for causing access from the host computer to be switched from the migration source file sharing device to the migration destination file sharing device;
    means for detecting a migration status, which at least includes a "being copied" status and a "copied" status, of a file of said one of the migration source shared file systems to which access has been requested by the host computer;
    first means for providing the file from said one file system of the migration destination file sharing device to the host computer during the per shared file system file migration in a case where the detected migration status of the file is the "copied" status where the file can be used from said one file system of the migration destination file sharing device; and
    second means for providing the file from said one file system of the migration source file sharing device to the host computer during the per shared file system file migration in a case where the detected migration status of the file is the "being copied" status where the file cannot be used from said one file system of the migration destination file sharing device.

2. The migration destination file sharing device of claim 1, further comprising means for updating the network environment information of the migration source file sharing device to other values after starting the migration destination file sharing device on the basis of temporary setting-use network environment information, and for causing the migration destination file sharing device to inherit the updated network environment information of the migration source file sharing device.

3. The migration destination file sharing device of claim 2, further comprising monitoring means for monitoring whether or not the network environment information of the migration source file sharing device has been updated to the other values.

4. The migration destination file sharing device of claim 2, wherein the inheriting of the network environment information from the migration source file sharing device and the updating of the network environment information of the migration source file sharing device are respectively conducted by remote control.

5. The migration destination file sharing device of claim 1, further including use frequency detecting means that detects the use frequency of files that cannot be used from the file system of the migration destination file sharing device, wherein data migrating priority is given to files whose use frequency detected by the use frequency detecting means is equal to or greater than a predetermined value.

6. The migration destination file sharing device of claim 1, wherein:
    data migration statuses include
    (A) a first migration status representing a "not copied" status where migration of a file from the file system of the migration source file sharing device to the file system of the migration destination file sharing device has not been conducted,
    (B) a second migration status representing the "being copied" status where the file is migrating from the file system of the migration source file sharing device to the file system of the migration destination file sharing device,
(C) a third migration status representing the "copied" status where migration of the file from the file system of the migration source file sharing device to the file system of the migration destination file sharing device has been completed, and
(D) a fourth migration status representing a "direct accessing by client at source" status where the file is being provided from the file system of the migration source file sharing device; and
(a) in the case of the first migration status, a migration status of file to which access has been requested is changed to the fourth migration status, provides the file from the file system of the migration source file sharing device, and thereafter returns the migration status of the file to the first migration status,
(b) in the case of the second migration status, the file from the file system of the migration source file sharing device is provided in a read-only mode,
(c) in the case of the third migration status, the file from the file system of the migration destination file sharing device is provided, and
(d) in the case of the fourth migration status, the file from the file system of the migration source file sharing system is provided in the read-only mode and thereafter the migration status of the file is changed to the first migration status.

7. A method of causing data to migrate from a file system of a migration source file sharing device to a file system of a migration destination file sharing device via a communications network, the method including the steps of:
a step of relating a plurality of migration source shared file systems of the migration source file sharing device to plurality of migration destination shared file systems of the migration destination file sharing device by shared file system basis and for determining a mount point for network-mounting one of the migration source shared file systems of the migration source file sharing device, which is migration-related to the shared file systems of the migration destination file sharing device, as a migration source shared file system onto the migration destination file sharing device, and the migration source shared file systems each having a plurality of files;
a step of migrating files from the migration source file sharing device to the migration destination file sharing device on a file by file basis per shared file system;
a step of setting or changing a migration status of each file;
a step of causing access from a host computer to be switched from the migration source file sharing device to the migration destination file sharing device;
a step of detecting a migration status, which at least includes a "being copied" status and a "copied" status, of a file of said one of the migration source shared file systems to which access has been requested by the host computer;
a first step of providing the file from said one file system of the migration destination file sharing device to the host computer during the per shared file system file migration in a case where the detected migration status of the file is the "copied" status where the file can be used from said one file system of the migration destination file sharing device; and
a second step of providing the file from said one file system of the migration source file sharing device to the host computer during the per shared file system file migration in a case where the detected migration status of the file is the "being copied" status where the file cannot be used from said one file system of the migration destination file sharing device.

8. The inter-file sharing device data migration method of claim 7, wherein the step of causing access from the host computer to be switched to the migration destination file sharing device is one that causes access from the host computer to be switched from the migration source file sharing device to the migration destination file sharing device without changing network connection information that is set in the host computer.

9. A computer program stored in a computer readable medium implemented in a file server and for causing data to migrate from a migration source file sharing device to a migration destination file sharing device via a communications network, comprising:
a module for relating a plurality of migration source shared file systems of the migration source file sharing device to plurality of migration destination shared file systems of the migration destination file sharing device by shared file system basis and for determining a mount point for network-mounting one of the migration source shared file systems of the migration source file sharing device, which is migration-related to the shared file systems of the migration destination file sharing device, as a migration source shared file system onto the migration destination file sharing device, and the migration source shared file systems each having a plurality of files;
a module for migrating files from the migration source file sharing device to the migration destination file sharing device on a file by file basis per shared file system;
a module for setting or changing a migration status of each file;
a module for causing access from a host computer to be switched from the migration source file sharing device to the migration destination file sharing device;
a module for detecting a migration status, which at least includes a "being copied" status and a "copied" status, of a file of said one of the migration source shared file systems to which access has been requested by the host computer;
a first module for providing the file from said one file system of the migration destination file sharing device to the host computer during the per shared file system file migration in a case where the detected migration status of the file is the "copied" status where the file can be used from said one file system of the migration destination file sharing device; and
a second module for means for providing the file from said one file system of the migration source file sharing device to the host computer during the per shared file system file migration in a case where the detected migration status of the file is the "being copied" status where the file cannot be used from said one file system of the migration destination file sharing device.

10. The migration destination file sharing device of claim 1, further comprising:
means for causing the migration destination file sharing device to inherit, prior to data migration, network environment information for identifying the migration source file sharing device on the communications network.

11. The migration destination file sharing device of claim 1, wherein the means for relating the shared file system of the migration destination file sharing device with the shared file system of the migration source file sharing device copies a name of the shared file system of the migration source file sharing device so as to be a name of the shared file system of the migration destination file sharing device.

12. The inter-file sharing device data migration method of claim 7, further comprising the step of:
 causing the migration destination file sharing device to inherit, prior to data migration, network environment information for identifying the migration source file sharing device on the communications network.

13. The inter-file sharing device data migration method of claim 7, wherein the step of relating the shared file system of the migration destination file sharing device with the shared file system of the migration source file sharing device includes copying a name of the shared file system of the migration source file sharing device so as to be a name of the shared file system of the migration destination file sharing device.

14. The computer program stored in a computer readable medium of claim 9, further comprising:
 a module for causing the migration destination file sharing device to inherit, prior to data migration, network environment information for identifying the migration source file sharing device on the communications network.

15. The computer program stored in a computer readable medium of claim 9, wherein the module for relating the shared file system of the migration destination file sharing device with the shared file system of the migration source file sharing device copies a name of the shared file system of the migration source file sharing device so as to be a name of the shared file system of the migration destination file sharing device.

16. In a file sharing system that comprises a host computer, a source file sharing device, and a destination file sharing device communicably connected to the source file sharing device and the host computer via a communications network, the destination file sharing device includes:
 a control unit, the control unit being operatively formed to migrate files from the source file sharing device to the destination file sharing device and to include
 a first component that relates a plurality of migration source shared file systems of the migration source file sharing device to plurality of migration destination shared file systems of the migration destination file sharing device, by shared file system basis, said first component being configured to determine a mount point for network-mounting one of the migration source shared file systems of the migration source file sharing device, which is migration-related to the shared file systems of the migration destination file sharing device, on as a migration source shared file system onto the migration destination file sharing device, and the migration source shared file systems each having a plurality of files;
 a second component that migrates the files from the source file sharing device to the destination file sharing device on a file by file basis per shared file system;
 a third component that sets or changes a migration status of each file;
 a fourth component that causes access from the host computer to switch from the source file sharing device to the destination file sharing device;
 a fifth component that detects a migration status, which at least includes a "being copied" status and a "copied" status, of a file of said one of the migration source shared file systems to which access has been requested by the host computer;
 a sixth component that provides the file from said one file system of the migration destination file sharing device to the host computer during the per shared file system file migration in a case where the detected migration status of the file is the "copied" status where the file can be used from said one file system of the migration destination file sharing device; and
 a seventh component that provides the file from said one file system of the migration source file sharing device to the host computer during the per shared file system file migration in a case where the detected migration status of the file is the "being copied" status where the file cannot be used from said one file system of the migration destination file sharing device.

17. The migration destination file sharing device of claim 10, wherein the means for causing the migration destination file sharing device to inherit, prior to data migration, network environment information for identifying the migration source file sharing device on the communications network further includes
 means for acquiring the network environment information from the migration source file sharing device,
 means for changing the network environment information into change-use network environment information and for restarting the migration source file sharing device,
 means for confirming whether the migration source file sharing device restarts with the change-use network environment information, and
 means for changing network environment information of the migration destination file sharing device into the original network environment information of the migration source file sharing device.

18. The inter-file sharing device data migration method of claim 12, wherein the step of causing the migration destination file sharing device to inherit, prior to data migration, network environment information for identifying the migration source file sharing device on the communications network further includes
 acquiring the network environment information from the migration source file sharing device,
 changing the network environment information into change-use network environment information and for restarting the migration source file sharing device,
 confirming whether the migration source file sharing device restarts with the change-use network environment information, and
 changing network environment information of the migration destination file sharing device into the original network environment information of the migration source file sharing device.

19. The computer program stored in a computer readable medium of claim 14, wherein the module for causing the migration destination file sharing device to inherit, prior to data migration, network environment information for identifying the migration source file sharing device on the communications network further includes the functions of:
 acquiring the network environment information from the migration source file sharing device,
 changing the network environment information into change-use network environment information and for restarting the migration source file sharing device, confirming whether the migration source file sharing device restarts with the change-use network environment information, and changing network environment information of the migration destination file sharing device into the original network environment information of the migration source file sharing device.

20. In a file sharing system that comprises a host computer, a source file sharing device, and a destination file sharing device communicably connected to the source file sharing device and the host computer via a communications network, according to claim 16, further comprising:

an eighth component that causes the migration destination file sharing device to inherit, prior to data migration, network environment information for identifying the migration source file sharing device on the communications network.

21. In a file sharing system that comprises a host computer, a source file sharing device, and a destination file sharing device communicably connected to the source file sharing device and the host computer via a communications network, according to claim 20, wherein the eighth component is further formed to acquire the network environment information from the migration source file sharing device, to change the network environment information into change-use network environment information and for restarting the migration source file sharing device, to confirm whether the migration source file sharing device restarts with the change-use network environment information, and to change network environment information of the migration destination file sharing device into the original network environment information of the migration source file sharing device.

22. The migration destination file sharing device of claim 1, wherein said means for relating is further configured to correspond a name of a migration source host, a name of said one shared file system of the migration source file sharing device, the mount point, a name of said one shared file system of the migration destination file sharing device, and a file migration status of files to be migrated to one another.

23. The migration destination file sharing device of claim 1, wherein said means for relating is further configured to correspond a name of a migration source host, a name of said one shared file system of the migration source file sharing device, and a name of said one shared file system of the migration destination file sharing device to one another.

24. The inter-file sharing device data migration method of claim 7, wherein the step of relating further includes corresponding a name of a migration source host, a name of said one shared file system of the migration source file sharing device, the mount point, a name of said one shared file system of the migration destination file sharing device, and a file migration status of files to be migrated to one another.

25. The inter-file sharing device data migration method of claim 7, wherein the step of relating further includes corresponding a name of a migration source host, a name of said one shared file system of the migration source file sharing device, and a name of said one shared file system of the migration destination file sharing device to one another.

26. The computer program stored in a computer readable medium of claim 9, wherein the module for relating is further configured to correspond a name of a migration source host, a name of said one shared file system of the migration source file sharing device, the mount point, a name of said one shared file system of the migration destination file sharing device, and a file migration status of files to be migrated to one another.

27. The computer program stored in a computer readable medium of claim 9, wherein the module for relating is further configured to correspond a name of a migration source host, a name of said one shared file system of the migration source file sharing device and a name of said one shared file system of the migration destination file sharing device to one another.

28. In the file sharing system according to claim 16, wherein the first component is further configured to correspond a name of a migration source host, a name of said one shared file system of the migration source file sharing device, the mount point, a name of said one shared file system of the migration destination file sharing device, and a file migration status of files to be migrated to one another.

29. In the file sharing system according to claim 16, wherein the first component is further configured to correspond a name of a migration source host, a name of said one shared file system of the migration source file sharing device, and a name of said one shared file system of the migration destination file sharing device to one another.

30. The migration destination file sharing device of claim 1, wherein said second means for providing provides the file from said one file system of the migration source file sharing device to the host computer during the per shared file system file migration in a case where the detected migration status of the file is a "not copied" status or a "direct accessing by client at source" status where the file cannot be used from said one file system of the migration destination file sharing device.

31. The inter-file sharing device data migration method of claim 7, wherein the second step of providing involves providing the file from said one file system of the migration source file sharing device to the host computer during the per shared file system file migration in a case where the detected migration status of the file is a "not copied" status or a "direct accessing by client at source" status where the file cannot be used from said one file system of the migration destination file sharing device.

32. The computer program stored in a computer readable medium of claim 9, wherein the second module for providing provides the file from said one file system of the migration source file sharing device to the host computer during the per shared file system file migration in a case where the detected migration status of the file is a "not copied" status or a "direct accessing by client at source" status where the file cannot be used from said one file system of the migration destination file sharing device.

33. In the file sharing system according to claim 16, wherein the seventh component provides the file from said one file system of the migration source file sharing device to the host computer during the per shared file system file migration in a case where the detected migration status of the file is a "not copied" status or a "direct accessing by client at source" status where the file cannot be used from said one file system of the migration destination file sharing device.

* * * * *